UNITED STATES PATENT OFFICE.

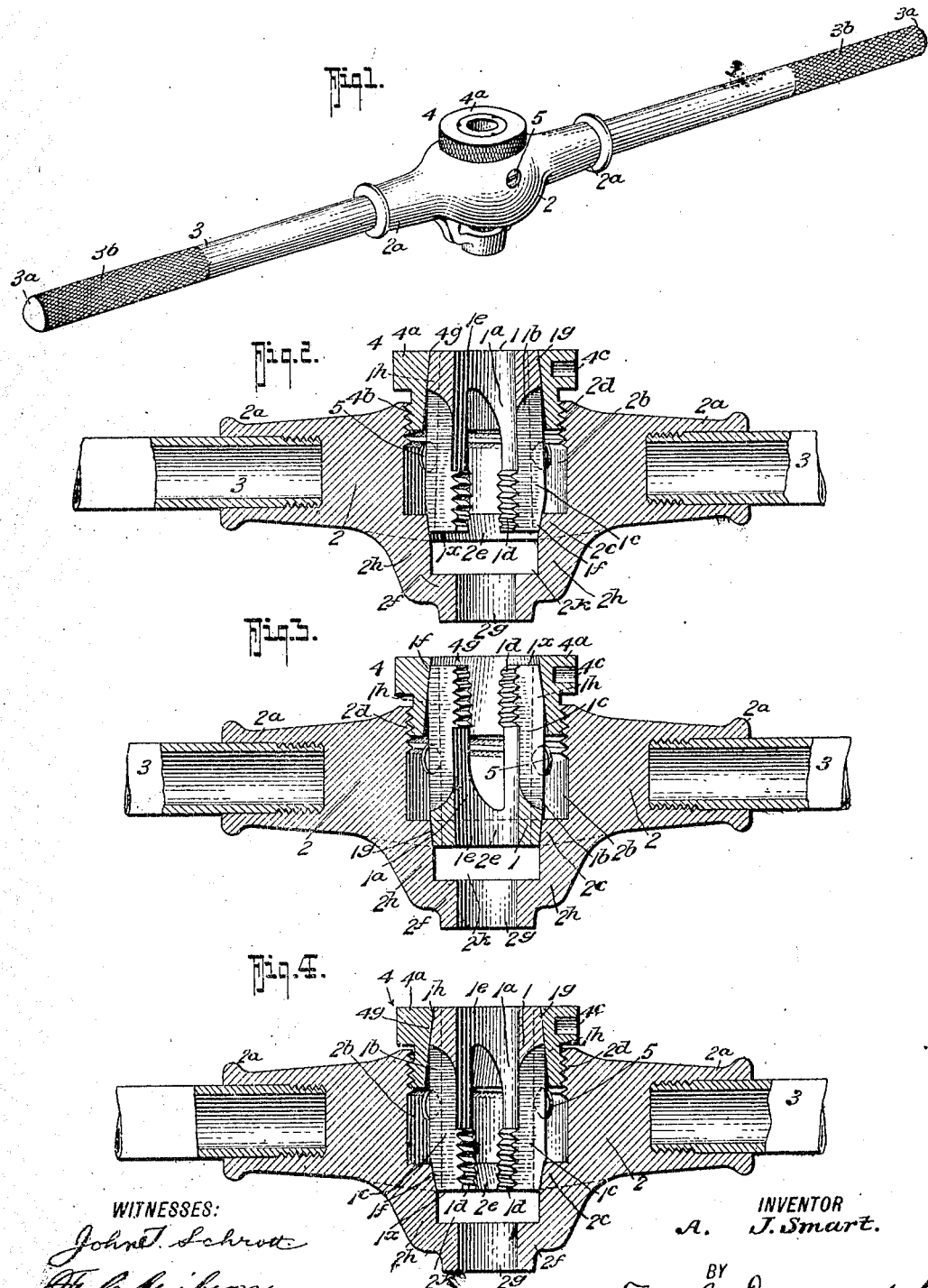

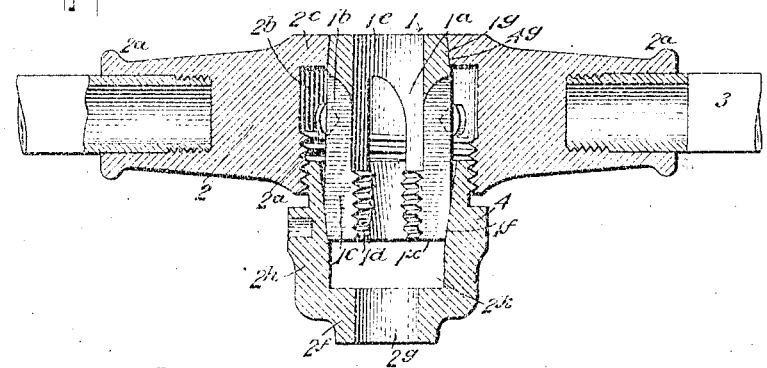
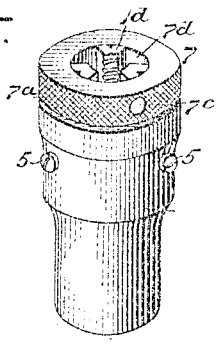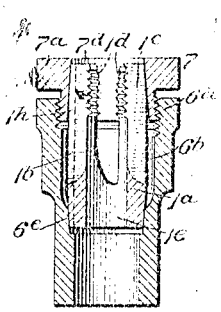
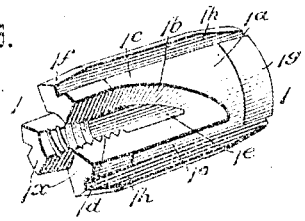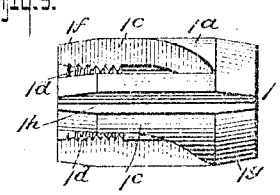
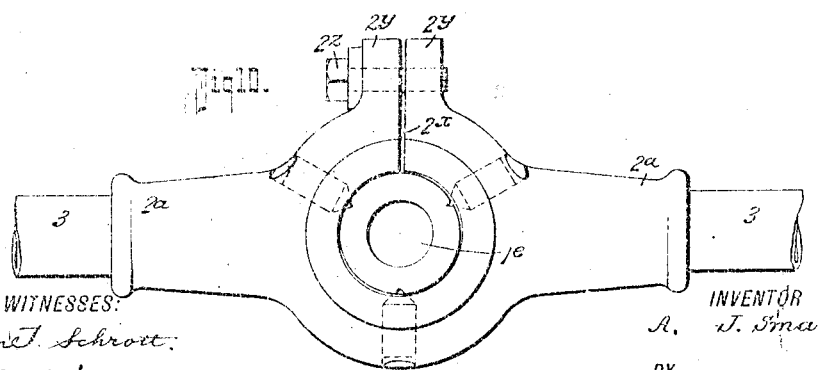

ALBERT J. SMART, OF GREENFIELD, MASSACHUSETTS.

SCREW-CUTTING DIE AND HOLDER THEREFOR.

No. 871,451.      Specification of Letters Patent.      Patented Nov. 19, 1907.

Application filed October 30, 1906. Serial No. 341,285.

*To all whom it may concern:*

Be it known that I, ALBERT J. SMART, residing at Greenfield, in the county of Franklin and State of Massachusetts, have invented certain new and useful Improvements in Screw-Cutting Dies and Holders Therefor, of which the following is a specification.

My invention relates to certain new and useful improvements in screw cutting dies and stocks or holders therefor.

Primarily, my invention has for its object to provide an elastic, reversible and adjustable die of a very simple and effective construction, which will be inexpensive to manufacture, easy to adjust, easy to center and having a capacity to cut either larger or smaller than its normal size.

My invention also has for its object to provide a stock or holder for the die to coöperate therewith.

In its generic nature, my invention comprises a die consisting of a tubular member provided with a plurality of prongs or fingers which carry the cutting teeth and are more or less of a resilient nature, by reason of their peculiar construction, the fingers or prongs of the die having longitudinal grooves to coöperate with strengthening and centering screws of the stock or holder. The die is also provided with conical end portions to coöperate with conical seats in the holder so that the screw cutting portions of the die may be drawn closer together or allowed to spring farther apart as it is made necessary to cut threads on bars or rods of varying diameters between certain limits.

In its more subordinate nature, my invention comprises certain novel construction, combination and detail arrangement of parts, all of which will be first described in detail, and then be specifically pointed out in the appended claims, reference being had to the accompanying drawings, in which:—

Figure 1, is a perspective view of a die stock and die embodying my invention. Fig. 2, is a central longitudinal section thereof, showing the position of the parts when the die is adjusted in its first position with its cutting portion adjacent the guide of the stock. Fig. 3, is a similar view showing the die reversed. Fig. 4, is a view similar to Fig. 2, showing the die adjusted to cut threads on a rod of lesser diameter than those under the adjustment shown in Fig. 2. Fig. 5, is a view similar to Fig. 2, showing a modified form of die stock. Fig. 6, is a perspective view of a machine collet. Fig. 7, is a central vertical longitudinal section of a machine collet. Fig. 8, is a detail perspective view of one of the dies removed from its holder. Fig. 9, is a side elevation of the die shown in Fig. 8. Fig. 10, is a detail view of a slightly modified form of die stock.

Referring now to the accompanying drawings in which like letters and numerals of reference indicate like parts in all of the figures, it will be seen that my improved die 1 comprises a body portion $1^a$ which is cut away as at $1^b$ to form prongs $1^c$, preferably three in number, and spaced equi-distantly apart, the die having a central bore $1^e$ and the prongs $1^c$ being provided on their inner faces with cutting projections $1^d$, as indicated. The prongs $1^c$ are provided with longitudinal grooves $1^h$ lying in parallel alinement with the central axis of the die and the die 1, has its outer surface provided with beveled or conical faces $1^f$—$1^g$ for a purpose presently explained.

In the process of manufacturing dies of this type the die is made to cut larger than its normal size by a process of hardening and tempering. In fact, it is always larger than its normal size as the process expands or spreads the prongs of the cutting end of the die and hence after the die has been formed the prongs or cutting ends of the die are slightly expanded, as indicated in Fig. 2. Of course, in practice, this expansion of the cutting ends of the prongs of the die will be only slight and will depend upon the size of the die, and hence it becomes necessary to provide means whereby the cutting ends of the prongs of the die can be drawn together to cut threads on a blank of a given size known as the normal size blank which the die is adapted to cut. My die also has its cutting projections so arranged that the die can be used to cut either from the face side or from the butt or bottom side of the same, as will be presently more fully explained.

I am aware that prior to my invention dies formed with prongs and having their outer surfaces smooth have been in use and means have been provided for drawing the prongs or cutting ends of the die together, and this means so far as I am aware has usually been in the nature of a clamp band, such for instance as that disclosed in a patent granted to W. L. Dixon, granted May 5, 1891; #451,890. A serious objection to this method of adjusting the ends of the die is that this method of adjusting the prongs is very imperfect since the edges are not drawn equally to the center or axial line of the die; the cutting edges nearest the screws will be first effected, thereby making an unequal adjustment of said cutting edges. To obviate this undesirable feature, I have provided an improved form of holder for this particular die which has provisions for uniformly adjusting the die.

By reference to Figs. 1 to 5 inclusive it will be seen that the die stock comprises a body 2 having laterally projected hub portions $2^a$ into which the handle members 3 are screwed. The handle member 3 may be in the nature of tubular rods having closed ends $3^a$ and milled hand engaging portions $3^b$, as indicated in Fig. 1. The body portion 2 of the stock is bored out to form a cylindrical chamber $2^b$ which merges with a shoulder $2^c$ at one end and is provided with threaded portion $2^d$ at the other end. The shoulder $2^c$ is provided with a centrally arranged aperture $2^e$ whose surface is the frustum of a cone having its greater diameter adjacent the chamber $2^b$.

Projecting from the body portion 2 adjacent the web $2^c$ is a guide $2^f$ which is centrally apertured at $2^g$ to permit passage of the blank to be operated upon, the guide $2^f$ being spaced from the body portion 2 by lugs $2^h$, as shown, to form an opening $2^k$ between the guide $2^f$ and the web $2^c$ to permit the discharge of chips, etc. A screw cap having a milled edge $4^a$ and a threaded barrel $4^b$ is provided to coöperate with the threads $2^d$ and close the chamber $2^h$. The milled edge $4^a$ may be provided with radial sockets $4^c$ to receive an operating tool or wrench, if desired. The cap 4 is provided with a central aperture whose surface is in the nature of a frustum of a cone whose edge of greater diameter is at the threaded end of the barrel $4^b$ so that the greater diameters of the conical frustum surfaces of the apertures $2^e$ and $4^d$ will lie adjacent one another.

The body portion 2 of the stock is provided with a series of set screws 5 preferably arranged triangularly to coöperate with the grooves $1^h$ of the die and strengthen or reinforce the cutting prongs thereof as well as hold the die in position in the stock from turning.

In the practical application of my invention the die 1 is inserted into the body portion 2 of the stock with its cutting end down adjacent the guide $2^f$ so that the surface $1^f$ of the cutting end of the die 1 will coincide with that of the aperture $2^e$ and the conical surface $1^x$ of the die 1 will coincide with that of the aperture $4^x$ of the cap 4.

When the parts are in the position shown in Fig. 2, before the cap $4^a$ is screwed tightly in the chamber or socket $2^b$ the prongs $1^c$ of the die will be in their expanded position and when the die and stock are in the position shown in Fig. 2, the threads will cut larger than their normal size, and when it is desired to cut a thread of the normal size of the die then the cap 4 can be screwed down as shown in Fig. 4, it being understood that by virtue of the conical ends of the die and the conical surface $2^e$ the prongs of the die will be drawn together equally toward the center or axial line of the die and hence the cutting prongs of the die will always remain centered so that they will properly operate upon the blank.

It is often desirable in practice, to cut a thread, say for instance, on a bolt, all the way down to the head of the bolt. When this is to be done the thread can be started with the die 1 in the stock in the position shown in Figs. 2 or 4, as the case may be, until the thread has been cut as far as may be desired, or until the head of the bolt abuts the guide $2^f$, after which the bolt can be withdrawn from the die or stock by unscrewing the cap 4, and inverted say in the position shown in Fig. 3, after which the thread may be continued on the bolt until the head engages the cutting end $1^x$ of the prongs $1^c$, thus running the thread all the way down to the head of the bolt.

When the die is in the position shown in Fig. 3, the adjustment of the cap 4 in its socket will either draw the prongs of the die together or permit them to spring apart depending upon the distance in which the cap is screwed in its socket and when the die is in the position shown in Fig. 3 the adjustment of the prongs toward or from each other is effected by the conical surface $1^f$ of the die and that of the aperture $4^d$.

Thus it will be seen I have provided a very simple and effective construction of die stock capable of use in connection with my improved die and of such a character that the die can be instantly centered in the stock by reason of the conical ends of the die and the conical surface of the apertures $2^e$ and $3^d$ and after the die has been placed in its initial position in the stock, the set screws 5 can be adjusted to snugly fit in the grooves $1^h$, after which no further adjustment of the screws 5 is necessary, since when it is desired to remove the die from the stock or change its adjustment, it is only necessary to withdraw the die say from the position shown in Fig. 2 and after inverting the same slide it back in place in the stock. The grooves running from end to end of the die, permit the same to be inserted without moving the set screws 5.

Again, my improved construction of die is equally well adapted for use in a hand stock, as shown in Figs. 1 to 5 inclusive or the same may be used in a machine collet as shown in Figs. 6 and 7, since the die is reversible and cuts either from the face side or from the butt side.

The machine collet shown in Fig. 6, is centrally apertured and provided with a conical seat $6^a$ that corresponds with the seat $2^a$ of hand stock and is also provided with a chamber $6^b$ that corresponds with the chamber $2^b$ of the hand stock. The collet 6 is also screw-threaded as at $6^d$ to receive a cap 7 having a milled flange $7^a$ and a center aperture $7^d$ whose surface is in the nature of a frustum of a cone and corresponds with that of the aperture $4^a$ of the cap 4. The cap 7 may have its milled flange provided with wrench or tool receiving apertures $7^c$, if found desirable.

In Fig. 5, I have shown a slightly modified form of hand stock, in which the guide $2^f$ is connected by lugs $2^h$ to the cap 4 instead of to the body portion 2, as shown in Figs. 1 to 4 inclusive. The hand stock may also have its body portion split as at $2^x$ and provided with lugs $2^y$ through which a set screw $2^z$ may pass to draw the lugs $2^z$ together and in that way make the stock resilient.

While I have shown the die as having a groove in each prong, I desire it understood that while only one or more of said grooves may be found necessary in practice, to serve the function of preventing the die from turning in the stock, or holder, I prefer the three grooves and the three set screws since by such arrangement the prongs are materially reinforced and thereby equalize the strain upon the prongs of the die. By having three cutting edges, gives better clearance, more relief, and less tendency to become clogged with chips and thereby makes it easier cutting than it would be if the die had more cutting edges, consequently making smoother threads and giving better results.

In manufacturing my die I find that several sizes of die can be made from a single die blank—for instance a die normally of one-half inch, can be made from a blank that will make all sizes from 0 to 1/2".

From the foregoing description taken in connection with the accompanying drawings it is thought the complete construction, operation and many advantages of my invention will be readily understood by those skilled in the art to which it appertains and I desire to say that many slight changes in the detail construction, combination and arrangement of parts can be made without departing from the scope of the appended claims or the spirit of the invention.

What I claim is:—

1. A die having cutting prongs and longitudinal grooves on its outer surfaces running from end to end, combined with a stock for receiving the die, means forming a coöperative part of the stock for moving the die longitudinally, said die and said stock having engaging surfaces effective to produce adjustment of the die prongs when the die is moved longitudinally, and means carried by the stock for engaging the longitudinal grooves, substantially as shown and described.

2. A holder comprising a body portion having an internally threaded chamber and a central passage having a conical seat, a closure cap for said chamber having a central passage and provided with a conical seat, combined with a resilient die having cutting prongs held within said stock, and having conical end portions to coöperate with said conical seats, together with means carried by the stock and coöperatively engaging the die between the conical ends thereof for reinforcing the cutting prongs of the die, substantially as shown and described.

3. A holder, comprising a body portion having an internally threaded chamber and a central passage having a conical seat, a closure cap for said chamber having a central passage and provided with a conical seat, said conical seats being of equal taper, combined with a resilient die reversibly held within the stock and having conical portions to coöperate with said conical seats, and a work guide at one side face of the holder, substantially as shown and described.

4. A die holder comprising a body portion having an internally threaded chamber and a central passage, a screw cap for said body portion, combined with a resilient die reversibly held within the stock, said screw cap and said body portion having provisions for engaging the die to adjust the same, and a work guide at one side face of the holder, substantially as shown and for the purposes described.

5. A die holder comprising a body portion having an internally threaded chamber and a central passage provided with a conical seat, a screw cap for said body portion having a threaded hub to project into the body portion and having a central aperture provided with a conical seat and an adjustable and reversible die having sections engaging the conical seats and a work guide at one side face of the holder, substantially as shown and for the purposes described.

6. A die holder comprising a body portion having an internally threaded chamber and a central aperture provided with a conical seat, a screw cap for said body portion having a threaded hub to project into the chamber of the body portion and having a central aperture provided with a conical seat, set screws carried by said body portion and projected into the internal chamber thereof, and a reversible and adjustable die having sections for engaging the conical seats and means coöperating with said set screws, and a work guide at one side face of the holder, substantially as shown and described.

7. A die holder comprising a body portion having an internally threaded chamber and a central passage provided with a conical seat, a screw cap for said body portion having a threaded hub to project into the chamber of the body portion and having a central aperture provided with a conical seat, an adjustable and reversible resilient die having a section engaging the aforesaid conical seats, and means carried by the body portion and coöperatively engaging the die in all of its operative positions for reinforcing the same and preventing the rotation thereof and a work guide at one side face of the holder, substantially as shown and described.

8. As a new article of manufacture, a resilient die having prongs and conical outer end surfaces and longitudinal grooves on its outer surfaces extending from end to end of the die, substantially as shown and described.

9. As a new article of manufacture, a resilient die having cutting prongs and longitudinal grooves on its outer surfaces extending from end to end thereof, substantially as shown and described.

ALBERT J. SMART.

Witnesses:
 FRANCIS N. THOMPSON,
 JOHN D. BOUKER.